US008255088B2

(12) United States Patent
Burkus, II et al.

(10) Patent No.: US 8,255,088 B2
(45) Date of Patent: Aug. 28, 2012

(54) METHOD FOR DISPENSING A VISCOUS MATERIAL

(75) Inventors: Frank S. Burkus, II, Cumming, GA (US); Laurence B. Saidman, Duluth, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 222 days.

(21) Appl. No.: 12/741,732

(22) PCT Filed: Nov. 25, 2008

(86) PCT No.: PCT/US2008/084651
§ 371 (c)(1), (2), (4) Date: May 6, 2010

(87) PCT Pub. No.: WO2009/070568
PCT Pub. Date: Jun. 4, 2009

(65) Prior Publication Data

US 2010/0250011 A1 Sep. 30, 2010

Related U.S. Application Data

(60) Provisional application No. 61/045,781, filed on Apr. 17, 2008, provisional application No. 60/990,984, filed on Nov. 29, 2007.

(51) Int. Cl.
*G05D 7/06* (2006.01)

(52) U.S. Cl. ............................ 700/283; 702/98; 222/52

(58) Field of Classification Search .................... 700/28, 700/29, 282, 283, 299; 137/467.5, 501, 504; 118/663, 668; 222/55, 61, 52; 427/8; 702/85, 702/98
See application file for complete search history.

(56) References Cited

U.S. PATENT DOCUMENTS

| | | | |
|---|---|---|---|
| 3,741,700 | A | 6/1973 | Hutchinson et al. |
| D281,250 | S | 11/1985 | Johnson et al. |
| 4,935,261 | A | 6/1990 | Srivastava et al. |

(Continued)

FOREIGN PATENT DOCUMENTS

GB 2297616 A 8/1996

OTHER PUBLICATIONS

Meltex Corporation, Assembly Hand Gun MP 3001350, Brochure, undated, 2 pgs.

(Continued)

*Primary Examiner* — Charles Kasenge
(74) *Attorney, Agent, or Firm* — Wood, Herron & Evans, L.L.P.

(57) ABSTRACT

A method is provided for dispensing materials (20) with fluctuating viscosity over time, such as liquid adhesives. Using a control algorithm derived from viscosity data or lab testing results, a first pressure or mechanical drive speed is used to force viscous material (20) from a supply syringe (14) during a first dispensing cycle. After a certain amount of time, a correction model is applied to the control algorithm to increase the pressure or drive speed as viscosity of the material (20) increases. A second higher pressure or drive speed is then used to force viscous material (20) from the supply syringe (14) during a second dispensing cycle. The correction model can be based on empirical data about the viscous material (20), or a camera system (30) can be used to periodically adjust the pressure or drive speed as required to maintain a substantially uniform dispensing rate.

10 Claims, 3 Drawing Sheets

U.S. PATENT DOCUMENTS

| | | | | |
|---|---|---|---|---|
| 4,988,015 | A * | 1/1991 | Price | 222/1 |
| 5,012,955 | A * | 5/1991 | Shannon | 222/61 |
| 5,019,409 | A * | 5/1991 | Wesling et al. | 438/127 |
| 5,038,038 | A | 8/1991 | Weniger et al. | |
| 5,190,075 | A * | 3/1993 | Tentler et al. | 137/501 |
| D335,809 | S | 5/1993 | Reifenberger | |
| 5,263,608 | A | 11/1993 | Kiernan et al. | |
| 5,271,521 | A | 12/1993 | Noss et al. | |
| D354,296 | S | 1/1995 | Walsh | |
| D365,830 | S | 1/1996 | Hubbard et al. | |
| 5,533,146 | A | 7/1996 | Iwai | |
| 5,666,325 | A | 9/1997 | Belser et al. | |
| 5,673,820 | A * | 10/1997 | Green et al. | 222/129.3 |
| 5,711,989 | A | 1/1998 | Ciardella et al. | |
| 5,801,951 | A | 9/1998 | Burns, II et al. | |
| D401,600 | S | 11/1998 | Byerly et al. | |
| 5,837,892 | A | 11/1998 | Cavallaro et al. | |
| 5,995,909 | A | 11/1999 | Bretmersky et al. | |
| D429,263 | S | 8/2000 | Auber et al. | |
| 6,123,302 | A | 9/2000 | Taylor | |
| 6,173,864 | B1 * | 1/2001 | Reighard et al. | 222/55 |
| D451,525 | S | 12/2001 | Ganzer | |
| D473,883 | S | 4/2003 | Huey et al. | |
| 6,541,304 | B1 * | 4/2003 | Bouras et al. | 438/108 |
| 6,572,033 | B1 | 6/2003 | Pullagura et al. | |
| D521,035 | S | 5/2006 | de Leeuw et al. | |
| D550,261 | S | 9/2007 | Bondeson et al. | |
| 7,278,550 | B2 | 10/2007 | Bezema et al. | |
| 7,296,706 | B2 | 11/2007 | Raterman et al. | |
| 2003/0148018 | A1 | 8/2003 | Hoffmann et al. | |
| 2005/0001869 | A1 | 1/2005 | Abermathy et al. | |
| 2005/0048195 | A1 * | 3/2005 | Yanagita et al. | 427/8 |
| 2005/0048196 | A1 * | 3/2005 | Yanagita et al. | 427/8 |

OTHER PUBLICATIONS

Nordson Corporation, H200 Zero Cavity Guns, Brochure, Oct. 1986, 1 pg.

Nordson Corporation, e.dot(TM) Electric Guns, Brochure, May 2003, 2 pgs.

Asymtek, DV-7000 Series Pump, Heli-Flow Pump, Servo-Controlled Auger Pump, Product Information, Sep. 2006, 2 pgs.

Asymtek, DP-3000 Series Linear Pump, DP-3000 Series: Linear Pump Technology for High-Volume Production, Dec. 2000, 2 pgs.

Asymtek, DV-01 Syringe Valve, website, 2008, 1 pg.

Speedmelt Module, 2004, 1 pg.

U.S. Patent and Trademark Office, International Search Report and Written Opinion in PCT Application No. PCT/US2008/084651, Jan. 16, 2009.

The State Intellectual Property Office of the People'S Republic of China, Office Action in CN Application Serial No. 200880117559.5, Apr. 26, 2012.

* cited by examiner

METHOD FOR DISPENSING A VISCOUS MATERIAL

This application claims the benefit of U.S. Provisional Patent Application Ser. Nos. 60/990,984, filed Nov. 29, 2007 (pending) and 61/045,781, filed Apr. 17, 2008 (pending), the disclosures of which are fully incorporated by reference.

BACKGROUND

Dispensing various types of viscous materials can be challenging due to changes in the viscosity of the material. Some types of materials, such as polyurethane reactive or PUR adhesives, tend to increase in viscosity by curing slightly over the time period of their use. For example, the viscous PUR material contained in a heated dispensing syringe may change during the time period that it is exposed to a manufacturing environment. For PUR adhesives, exposure to moisture or humidity in the environment will cause the viscosity to change due to slight curing since this material is designed to react in the presence of moisture or humidity. Various other materials exhibit changing viscosity over time such a two component adhesive systems that are pre-mixed and loaded into a dispenser such as a syringe or other materials used in various applications such as adhesives or sealants that thicken over time for any reason.

Pressurized air or fluid is often used to force the PUR adhesive from the syringe with or without the aid of a piston-type element. Assuming the air pressure supplied to the syringe stays the same, and the viscosity of the material increases, less material will be dispensed over time as the viscosity of the material increases. For this reason, the dispensed amount can become lower and lower over time and may even deviate from specifications or desired parameters. Other types of dispensers may exhibit similar challenges.

SUMMARY

In general, methods are provided for controlling the dispensing consistency of syringe or pressure-based dispensers when dispensing a viscous material that increases in viscosity over a time period of use. For example, a method may include dispensing the viscous material from a syringe during a first dispensing cycle and using a first dispense pressure against a movable element in the syringe (or simply using pressure to directly push on the material with no movable element). Alternatively, a mechanical drive may be used to directly or indirectly move the material. The pressure (or speed if a mechanical drive is used) is then increased according to a model or control feature that compensates for increasing viscosity of the viscous material according to a predetermined value associated with a time period. For example, the time period may be one during which the viscous material is exposed to the environment during a production cycle. The predetermined value may then be used, at least in part, in supplying a second dispense pressure or speed higher than the first dispense pressure or speed to the syringe after the known time period. The viscous material may then be dispensed with the increased viscosity during a second dispensing cycle. In this manner, for example, more consistency may be maintained to ensure that the viscous material dispensed during the first and second dispensing cycles are within desired parameters.

The model or control feature that is used, at least in part, to increase the pressure or speed may be based on empirical data associated with the viscous material. Alternatively, or in addition, the model may be based on an algorithm that may or may not also be based on empirical data associated with dispensing the viscous material. As another option, a lookup table of data may be used to determine the pressure supplied or drive speed used during the second dispensing cycle or subsequent dispensing cycles.

In another aspect, the method may comprise capturing an image of a dispensed amount of the viscous material, analyzing the captured image to determine whether the dispensed amount of viscous material is within desired parameters, and changing the pressure supplied to the dispenser or the drive speed in response to a determination that the dispensed amount of viscous material is outside of the desired parameters.

DETAILED DESCRIPTION OF THE ILLUSTRATIVE EMBODIMENTS

Figure 1:
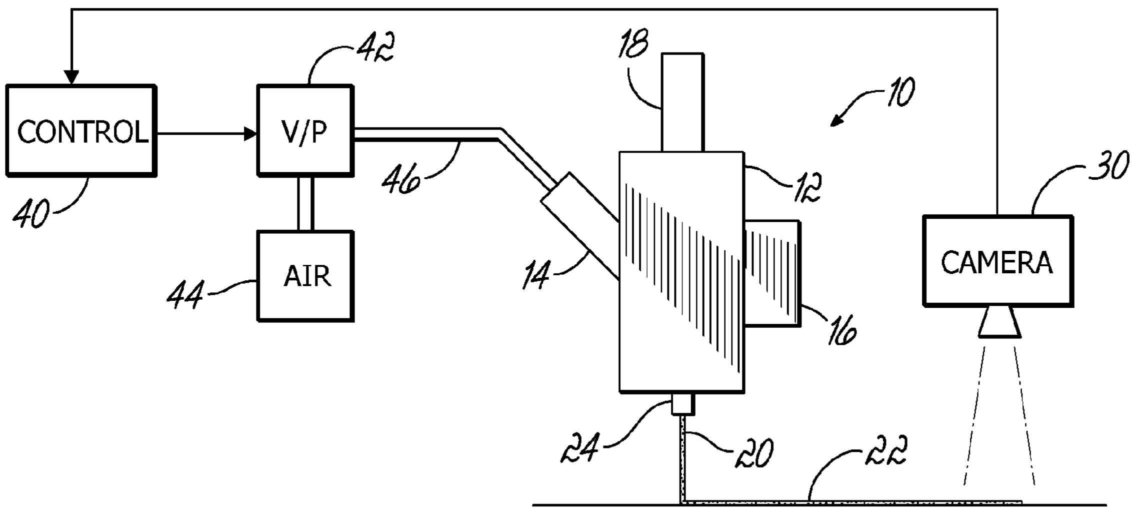
FIG. 1 is a schematically illustrated dispensing system constructed in accordance with an illustrative embodiment of the invention.

Referring to FIG. 1, a dispenser 10 configured in accordance with an illustrative embodiment of the invention generally includes an on/off dispenser valve 12. In this embodiment, valve 12 is a noncontact dispenser valve specifically designed for dispensing small amounts of viscous material, such as PUR adhesive. Various other contact or noncontact dispensers may alternatively be used with similar results. Noncontact dispenser 12 further includes a heated syringe style supply device 14 for supplying pressurized viscous material to dispenser 12. A control valve 16, which may take the form of a solenoid-operated air valve, may be directly connected to dispenser valve 12. In a known manner, control valve 16 supplies pressurized air into dispenser valve 12 to force an internal valve stem (not shown) into an open position. A conventional spring return mechanism 18 may be provided for moving the valve stem into a closed position when the pressurized air from control valve 16 is sufficiently reduced or turned off. Other manners of actuating dispenser valve 12 may be used instead. Further structural details and operation of dispenser valve 12 may also be conventional. Other types of dispensers may be used instead, such as those that do not employ any on/off valve element (e.g., simply a syringe device used alone).

Noncontact dispenser 12 operates to dispense a specific amount of viscous material 20, such as in the form of a bead 22, from a nozzle 24 as schematically shown in exaggerated form in FIG. 1. A sample bead 22 or specific amount of viscous material may be formed by one or more dispensed beads, or other patterns. A machine vision camera 30 is provided for capturing an image of the dispensed amount 22 as discussed further below.

Figure 2:
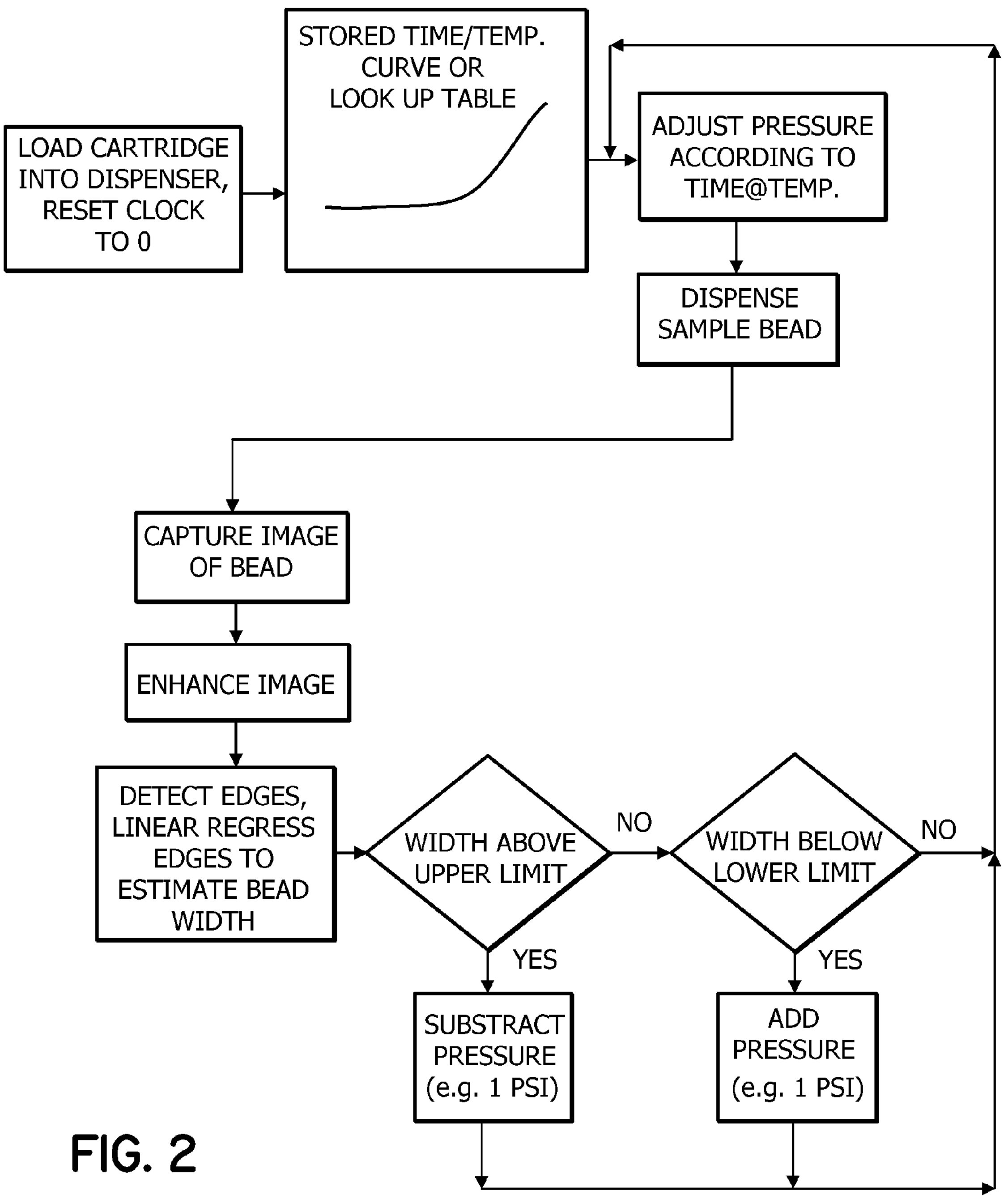
FIG. 2 is a flow chart illustrating the operation of the system shown in FIG. 1.

Referring to FIGS. 1 and 2, a control 40 is provided for operating the dispenser valve 12 and, more particularly, for providing suitable control or correcting signals to a voltage-to-pressure transducer 42 which converts the voltage to an air pressure such that a corrected air pressure is sent from a pressurized air supply 44 to an air line 46 connected with syringe 14. The voltage signal representing the corrected pressure is based at least in part on a value determined by the control 40. The voltage value may be stored or otherwise determined, such as by using a curve or algorithm, or a lookup table of data based on time and temperature information.

More specifically referring to the control flow diagram of FIG. 2 which represents the general operation of control 40, at the start of a dispensing process, a cartridge of PUR adhesive material is loaded into the heated syringe supply device 14 and a clock associated with the control 40 is set to "0." The temperature of the environment is also detected or recorded for use during the dispensing process. In accordance with the elapsed time and temperature, a value is determined by the control 40 and the pressure to the syringe 14 is adjusted accordingly. At the very start of the process, this value will keep the pressure at an initial setting appropriate for accurately dispensing the material at its known initial viscosity. Over time, however, the value will increase the pressure according to an amount based on a predetermined model that predicts viscosity changes of the material over time. This model may be based on experimentally determined data recorded previously for the same material under the same temperature and humidity conditions. The time period involved may, for example, be the expected production time over which the disposable cartridge (not shown) is used in syringe 14. This process may be used alone to establish more consistent cycle to cycle dispensing of the viscous material.

An example of the control algorithm used to determine pressure over time is as follows. A general pressure control equation governs the overall system pressure P (in psi), i.e., the pressure delivered to the syringe 14, as a function of time t (in hours):

$$P=f(t)+\text{Offset}$$

The function f(t) varies for different adhesive types and is determined by laboratory testing. The Offset value adjusts for a starting pressure required to dispense a desired amount of adhesive, and one example of an equation used to determine an initial Offset value (in psi) based on a desired bead width (in mm) is:

$$\text{Offset}=(15.569\times\text{DesiredBeadWidth})-6.1464$$

This Offset equation changes for system parameters such as nozzle diameter. For a preferred adhesive 3M PUR 2655, an operating temperature of 250 degrees Fahrenheit, and a desired bead width of 1 millimeter, the initial Offset is 13.313 psi and the f(t) is 2.8378 multiplied by the time in hours. Consequently, the control algorithm for this example system would be:

$$P=(2.8378\times t)+13.313$$

Note that while the control algorithm used in the example system is linear, viscosity changes in the adhesive material become nonlinear after a number of hours. The system adjusts for this nonlinearity by either using cartridges of PUR adhesive that will be completely consumed in 4-6 hours, or by using the machine vision camera 30 as described below.

Further accuracy and consistency may be obtained by using the camera 30 illustrated in FIG. 1. Specifically, the camera 30 may be a model In-Sight 5100 available from Cognex Corp., using correlated In-Sight software. In this enhanced process, an image of the dispensed amount is captured with the camera 30. The dispensed amount may be a bead 22 dispensed on a work piece or another sample substrate. By using known functions and the mentioned software of the machine vision camera 30, the camera 30 may enhance the image, and detect the edges of the image to accurately estimate the bead width. The camera software may further determine whether the detected or estimated bead width is either above or below limits that are established and stored in the control 40 according to the desired bead width parameters. If the bead width is detected to be above the upper limit, the pressure to the syringe 14 is reduced, such as by an incremental predetermined value of 1 psi. On the other hand, if the bead width is detected to be below a lower limit, the control 40 sends a signal to adjust the air pressure upward, such as by adding an incremental amount of pressure of 1 psi. Incremental or decremental pressure adjustments in other amounts may be used instead, e.g., those with finer resolution such as 0.01 or 0.5 psi, for example. As another alternative, pressure adjustments may be made in percentage amounts such as 5% or 10% of the previous pressure value.

Continuing with the example control algorithm, the Offset value is changed in the algorithm periodically using the camera readings. The new Offset is calculated generally as follows:

$$\text{Offset}_{new}=\text{Offset}+(\text{Gain Term})\times(\text{Desired Bead Width}-\text{Measured Bead Width})$$

The new Offset on the left hand side of the above equation is then used in the control algorithm to adjust for inconsistencies in the actual dispensing of adhesive. The Gain Term is a programmable constant that converts measurements in millimeters to a pressure in psi. For the 3M PUR 2655 adhesive system at 250 degrees Fahrenheit described above, the Gain Term is 13 psi/mm. If the desired bead width is 1 millimeter and the camera 30 determines that the actual dispensed bead width is 1.15 millimeters, the new Offset would be computed as:

$$\text{Offset}_{new}=13.313+(13)\times(1-1.15)=11.363\text{ psi}$$

Consequently, the control algorithm then calculates a new system pressure $P_{new}$ according to the following:

$$P_{new}=(2.8378\times t)+11.363$$

The system then continues to operate under this new control algorithm until the camera 30 indicates that a change in the Offset value and system pressure are necessary. In some embodiments, a programmable pressure change parameter is necessary to limit the change in Offset for each consecutive camera image to a small value such as 0.1 psi or 0.5 psi. If the parameter is lower than the calculated change in Offset, the Offset will only increase or decrease by the parameter amount on this camera reading.

Figure 1A:
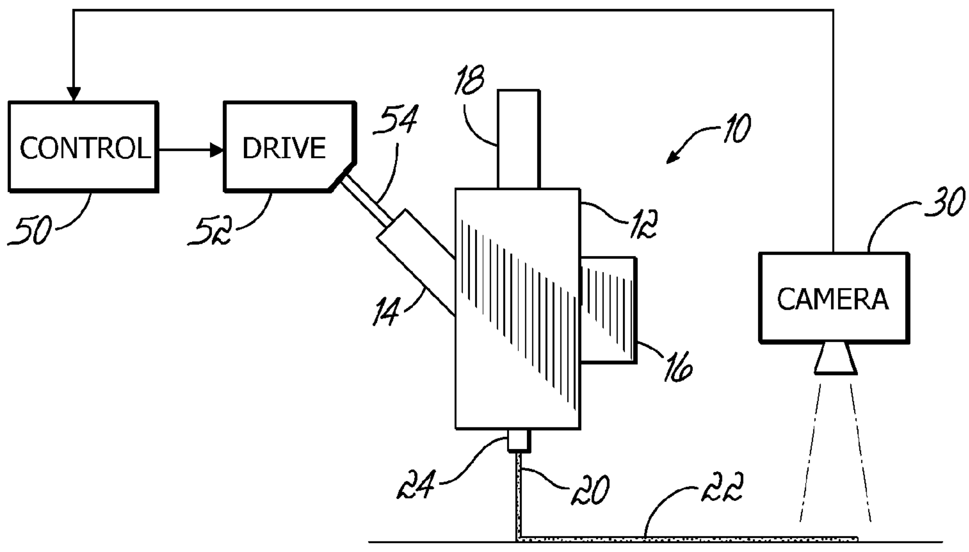
FIG. 1A is a schematically illustrated dispensing system constructed in accordance with a second illustrative embodiment of the invention.
Figure 2A:
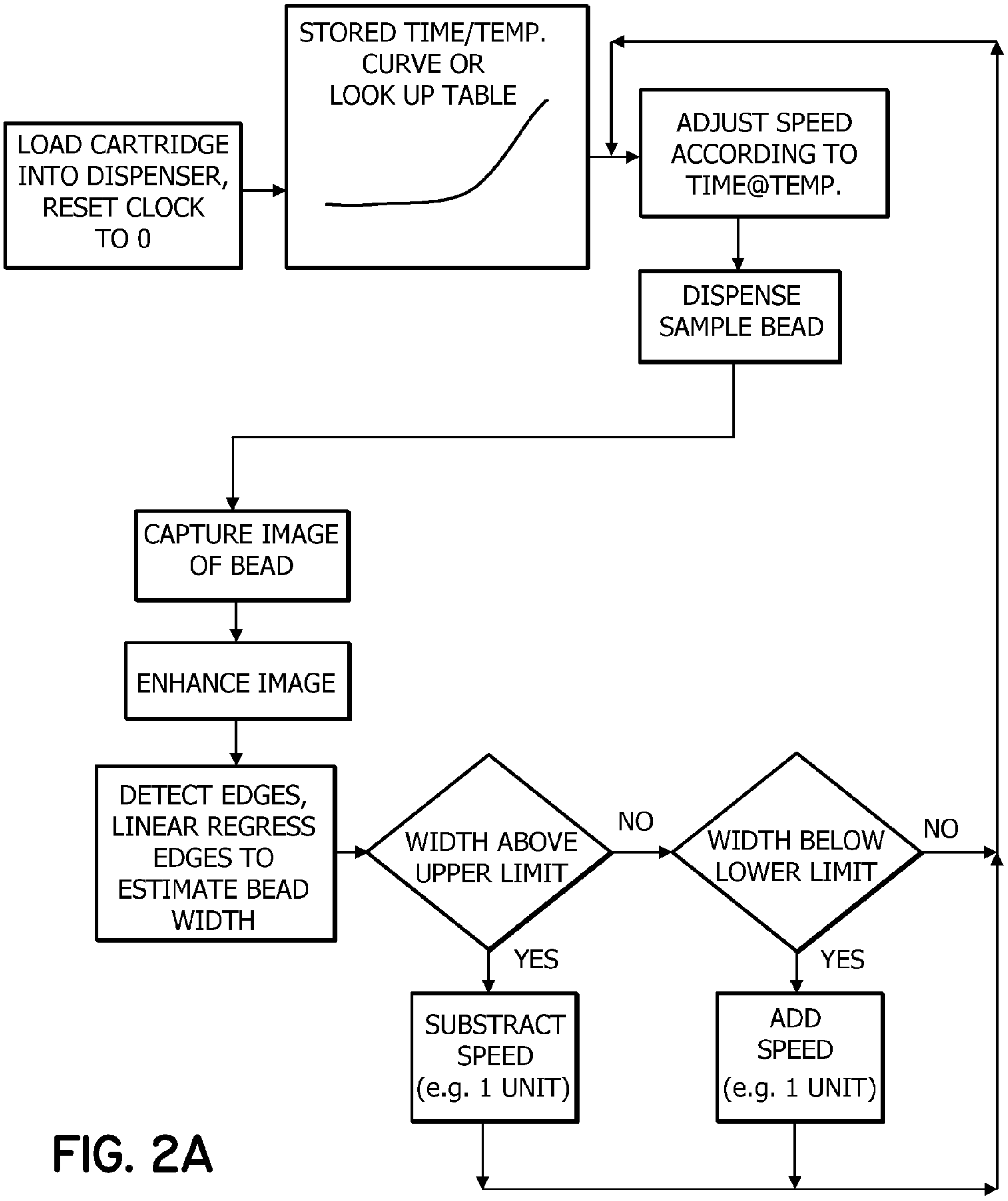
FIG. 2A is a flow chart illustrating the operation of the system shown in FIG. 1A.

FIGS. 1A and 2A respectively illustrate a schematic system and a flow chart in accordance with a second embodiment. This embodiment is the same, in principle and operation, as the embodiment described with respect to FIGS. 1 and 2, except that the pressure based system, represented by the control 40, voltage-to-pressure transducer 42 and pressurized air supply 44, is replaced by a control 50 and a mechanical drive 52 having a mechanical output element 54. The mechanical drive, for example, may comprise a servomotor, a stepper motor, and/or a linear drive device. The movable drive element 54 may, for example, rotate and thereby actuate a worm element (not shown) to directly force the material through the syringe 14, or a linearly actuable element that physically pushes a piston-like element through the syringe 14 to force the material through the dispenser 12. The control 50, instead of controlling an amount of fluid pressure as in the first embodiment, instead comprises a speed control that will change the speed (i.e., either the rotational speed or the linear speed) of the output element 54. A more specific description of the control 50 is given below.

The control flow diagram of FIG. 2A represents the general operation of control 50. At the start of a dispensing process, a cartridge of PUR adhesive material is loaded into the heated syringe supply device 14 and a clock associated with the control 50 is set to "0." The temperature of the environment is also detected or recorded for use during the dispensing process. In accordance with the elapsed time and temperature, a value is determined by the control 50 and the speed of the drive 52 or, more specifically, the output element 54, is adjusted accordingly. At the very start of the process, this value will keep the drive speed at an initial setting appropriate for accurately dispensing the material at its known initial viscosity. Over time, however, the value will increase the speed according to an amount based on a predetermined model that predicts viscosity changes of the material over time.

As in the first embodiment, this model may be based on experimentally determined data recorded previously for the same material under the same temperature and humidity conditions. The time period involved may, for example, be the expected production time over which the disposable cartridge (not shown) is used in syringe 14. This process may be used alone to establish more consistent cycle to cycle dispensing of the viscous material. Further accuracy and consistency may be obtained by using the camera 30 illustrated in FIG. 1A and as previously described. As mentioned above, the camera software determines whether the detected or estimated bead width is either above or below limits that are established and stored in the control 50 according to the desired bead width parameters. If the bead width is detected to be above the upper limit, the drive speed is reduced, such as by an incremental predetermined value of 1 unit. On the other hand, if the bead width is detected to be below a lower limit, the control 50 sends a signal to adjust the drive speed upward, such as by adding an incremental amount of drive speed, e.g., 1 unit. Incremental or decremental speed adjustments in any desirable amounts may be used.

In this embodiment, a control algorithm is used to determine the drive speed with respect to time. The formulas used are similar to the control equation and offset equation discussed above. Instead of a system pressure P, these equations will calculate rotational speed or linear speed of the mechanical drive 52. Consequently, the Gain Term of the new Offset equation and other constants will change to correspond to the new units of measurement. In all other respects, this control algorithm operates in an identical fashion with the example provided above.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A method of controlling dispensing consistency of a dispenser when dispensing a viscous material that increases in viscosity over time, the method comprising:

dispensing the viscous material from the dispenser during a first dispensing cycle and using a first dispense pressure for forcing the material from the dispenser;

detecting the temperature and humidity of the environment in which the viscous material is dispensed;

determining a correction value according to a model that uses the detected temperature and humidity to compensate for increasing viscosity of the viscous material over a time period;

supplying a second dispense pressure higher than the first dispense pressure to the dispenser in accordance with the correction value after the time period; and dispensing the viscous material with the increased viscosity during a second dispensing cycle.

2. The method of claim 1, wherein the model is based on empirical data associated with the viscous material.

3. The method of claim 1, wherein the model is based on an algorithm.

4. The method of claim 1, further comprising:

using a lookup table of data to determine the pressure used for the second dispensing cycle.

5. The method of claim 1, further comprising:

capturing an image of a dispensed amount of the viscous material;

analyzing the captured image to determine whether the dispensed amount of viscous material is within desired parameters; and changing the pressure supplied to the dispenser in response to a determination that the dispensed amount of viscous material is outside of the desired parameters.

6. A method of controlling dispensing consistency of a dispenser when dispensing a viscous material that increases in viscosity over time, the method comprising:

dispensing the viscous material from the dispenser during a first dispensing cycle and using a drive element operated at a first dispense speed for forcing the material from the dispenser;

detecting the temperature and humidity of the environment in which the viscous material is dispensed;

determining a correction value according to a model that uses the detected temperature and humidity to compensate for increasing viscosity of the viscous material over a time period;

using a second dispense speed higher than the first dispense speed in accordance with the correction value after the time period; and dispensing the viscous material with the increased viscosity during a second dispensing cycle.

7. The method of claim 1, wherein the model is based on empirical data associated with the viscous material.

8. The method of claim 1, wherein the model is based on an algorithm.

9. The method of claim 1, further comprising:

using a lookup table of data to determine the dispense speed used for the second dispensing cycle.

10. The method of claim 1, further comprising:

capturing an image of a dispensed amount of the viscous material;

analyzing the captured image to determine whether the dispensed amount of viscous material is within desired parameters; and changing the dispense speed in response to a determination that the dispensed amount of viscous material is outside of the desired parameters.

* * * * *

UNITED STATES PATENT AND TRADEMARK OFFICE

CERTIFICATE OF CORRECTION

PATENT NO. : 8,255,088 B2
APPLICATION NO. : 12/741732
DATED : August 28, 2012
INVENTOR(S) : Frank S. Burkus, II et al.

It is certified that error appears in the above-identified patent and that said Letters Patent is hereby corrected as shown below:

Column 6

Claim 7, line 49, change "1" to --6--.

Claim 8, line 51, change "1" to --6--.

Claim 9, line 53, change "1" to --6--.

Claim 10, line 56, change "1" to --6--.

Signed and Sealed this
Fifth Day of February, 2013

Teresa Stanek Rea
*Acting Director of the United States Patent and Trademark Office*